US012576888B2

(12) United States Patent
Chen et al.

(10) Patent No.: US 12,576,888 B2
(45) Date of Patent: Mar. 17, 2026

(54) MOTION POLICY PLANNER FOR NAVIGATION

(71) Applicant: NVIDIA Corporation, Santa Clara, CA (US)

(72) Inventors: Yuxiao Chen, Newark, CA (US); Sander Tonkens, La Jolla, CA (US); Edward Schmerling, Seattle, WA (US); Marco Pavone, Stanford, CA (US)

(73) Assignee: NVIDIA Corporation, Santa Clara, CA (US)

( * ) Notice: Subject to any disclaimer, the term of this patent is extended or adjusted under 35 U.S.C. 154(b) by 86 days.

(21) Appl. No.: 18/604,078

(22) Filed: Mar. 13, 2024

(65) Prior Publication Data

US 2025/0289474 A1     Sep. 18, 2025

(51) Int. Cl.
*B60W 60/00* (2020.01)

(52) U.S. Cl.
CPC ............................... *B60W 60/0027* (2020.02)

(58) Field of Classification Search
CPC .................................................. B60W 60/0027
USPC ........................................................ 701/23
See application file for complete search history.

(56) References Cited

U.S. PATENT DOCUMENTS

| | | | |
|---|---|---|---|
| 2023/0159054 A1* | 5/2023 | Jespersen .......... | B60W 60/0013 701/23 |
| 2023/0391374 A1* | 12/2023 | Chen ...................... | G06N 3/088 |
| 2024/0208533 A1* | 6/2024 | Cao ..................... | B60W 60/001 |
| 2025/0162612 A1* | 5/2025 | Woelki ............ | B60W 60/00274 |

OTHER PUBLICATIONS

Chen et al., "Interactive Joint Planning for Autonomous Vehicles", arXiv:2310.18301v4 [cs.RO], Nov. 22, 2023. pp. 11.
Chen et al., "Interactive multi-modal motion planning with Branch Model Predictive Control", arXiv:2109.05128v2 [eess.SY] Sep. 18, 2021. pp. 1-10.
Chen et al., "Tree-structured Policy Planning with Learned Behavior Models", arXiv:2301.11902v2 [cs.RO], Feb. 27, 2023. pp. 8.

(Continued)

*Primary Examiner* — Tiffany P Young
(74) *Attorney, Agent, or Firm* — Shook, Hardy & Bacon L.L.P.

(57) ABSTRACT

In various examples, policy prediction-based motion planner systems and methods for autonomous and semi-autonomous systems and applications are provided. A scenario tree structure may be generated that represents potential behaviors of one or more peripheral agents based on perception data of a scene within which an ego vehicle operates. A joint MPC algorithm may optimize the motion of an ego vehicle within the context of the scenario tree structure to produce a policy tree structure. An MPC policy prediction model may be trained to predict the policy tree structures that a joint MPC algorithm would produce, given a set of environmental perception data. An ego vehicle may comprise a trained MPC policy prediction model that receives perception data, and based on that input predicts a policy tree structure that may be used to define a motion policy for navigating the ego vehicle through the scene.

20 Claims, 13 Drawing Sheets

600

GENERATE A SCENARIO TREE STRUCTURE BASED AT LEAST ON PERCEPTION DATA CORRESPONDING TO A REPRESENTATION OF A SCENE THAT INCLUDES AT LEAST ONE PATH FOR EACH OF VEHICLE TRAFFIC, AN EGO AGENT, AND ONE OR MORE PERIPHERAL AGENTS, THE SCENARIO TREE STRUCTURE REPRESENTING A PLURALITY OF TRAJECTORY MODES FOR THE ONE OR MORE PERIPHERAL AGENTS OVER A PLANNING HORIZON
B602

WITHIN THE PLANNING HORIZON, PERFORM A JOINT MODEL PREDICTIVE CONTROL (MPC) OPTIMIZATION BASED AT LEAST ON THE SCENARIO TREE STRUCTURE AND A TRAJECTORY OF THE EGO AGENT TO GENERATE A POLICY TREE STRUCTURE THAT REPRESENTS A MOTION POLICY FOR NAVIGATING THE EGO AGENT THROUGH THE SCENE
B604

(56)          References Cited

OTHER PUBLICATIONS

Chen, Y., et al., "ScePT: Scene-consistent, Policy-based Trajectory Predictions for Planning", Proceedings of the IEEE/CVF Conference on Computer Vision and Pattern Recognition (CVPR), pp. 17103-17112 (2022).

Li et al., "MARC: Multipolicy and Risk-aware Contingency Planning for Autonomous Driving", arXiv:2308.12021v2 [cs.RO], Sep. 12, 2023. pp. 1-8.

Mobileye., "How Autonomous Vehicles Work: the Self-Driving Stack", Online available at: <https:..www.mobileye.com/blog/autonomous-vehicle-day-the-self-driving-stack/>, May 31, 2023. pp. 1-8.

Ngo, V, "Autonomous Vehicles Software Stack Overview", Available online at: <https://channgo2203.github.io/av_software/>, Nov. 17, 2020. pp. 1-5.

Nordell, B., "Trajectory Planning for Autonomous Vehicles and Cooperative Driving", Examensarbete Inom Elektroteknik, Avancerad Nivå, vol. 119. 2016, pp. 1-45.

U.S. Appl. No. 18/354,892, Title : Policy Planning Using Behavior Models for Autonomous Systems and Applications, filed Jul. 19, 2023.

U.S. Appl. No. 18/366,202, Title : Interactive Motion Planning for Autonomous Systems and Applications, filed Aug. 7, 2023.

U.S. Appl. No. 63/429,425, Title : Tree-structured Policy Planning with Learned Behavior Models, filed Dec. 1, 2022.

* cited by examiner

600

GENERATE A SCENARIO TREE STRUCTURE BASED AT LEAST ON PERCEPTION DATA CORRESPONDING TO A REPRESENTATION OF A SCENE THAT INCLUDES AT LEAST ONE PATH FOR EACH OF VEHICLE TRAFFIC, AN EGO AGENT, AND ONE OR MORE PERIPHERAL AGENTS, THE SCENARIO TREE STRUCTURE REPRESENTING A PLURALITY OF TRAJECTORY MODES FOR THE ONE OR MORE PERIPHERAL AGENTS OVER A PLANNING HORIZON
B602

WITHIN THE PLANNING HORIZON, PERFORM A JOINT MODEL PREDICTIVE CONTROL (MPC) OPTIMIZATION BASED AT LEAST ON THE SCENARIO TREE STRUCTURE AND A TRAJECTORY OF THE EGO AGENT TO GENERATE A POLICY TREE STRUCTURE THAT REPRESENTS A MOTION POLICY FOR NAVIGATING THE EGO AGENT THROUGH THE SCENE
B604

GENERATE PERCEPTION DATA CORRESPONDING TO A
REPRESENTATION OF AT LEAST A PORTION OF AN
ENVIRONMENT THAT INCLUDES AT LEAST AN EGO AGENT
AND ONE OR MORE PERIPHERAL AGENTS
B702

USING ONE OR MORE MACHINE LEARNING MODELS,
GENERATE A MOTION POLICY FOR NAVIGATING AN EGO
MACHINE THROUGH THE ENVIRONMENT BASED AT LEAST
ON THE PERCEPTION DATA, WHEREIN TO GENERATE THE
MOTION POLICY, THE ONE OR MORE MACHINE LEARNING
MODELS ARE TRAINED TO PREDICT A POLICY TREE
STRUCTURE CORRESPONDING TO A PREDICTED OUTPUT OF
A GRADIENT-BASED OPTIMIZATION CONFIGURED TO JOINTLY
OPTIMIZE TRAJECTORIES OF EGO AGENTS AND PERIPHERAL
AGENTS BASED AT LEAST ON THE PERCEPTION DATA
B704

FIGURE 7

SERVER(S) 878

CPU 880(B)

CPU 880(A)

PCIe SWITCH 882(D)

PCIe SWITCH 882(C)

PCIe SWITCH 882(B)

PCIe SWITCH 882(A)

GPU 884(F)

GPU 884(H)

GPU 884(E)

GPU 884(G)

GPU 884(B)

GPU 884(D)

GPU 884(A)

GPU 884(C)

886

888

876

800

894

892

NETWORK(S) 890

900

MEMORY
904

I/O COMPONENTS
914

CPU(s)
906

POWER SUPPLY
916

GPU(s)
908

PRESENTATION
COMPONENT(S)
918

COMM. INTERFACE
910

LOGIC UNIT(S)
920

I/O PORT(S)
912

902

1000

MOTION POLICY PLANNER FOR NAVIGATION

BACKGROUND

Ego vehicles, which may include autonomous and semi-autonomous vehicles or machines, often use computer vision technologies to develop an understanding of the details in their surroundings. For example, a computer vision representation of a scene around the ego vehicle that includes drivable surfaces (e.g., roadways) and other agents and objects such as other vehicles, pedestrians, and navigation hazards, can be generated based on data onboard sensors and computing resources. Environmental perception data can be generated based on the relationship of objects and other features of the scene as rendered within the computer vision representation. The ego vehicle may execute a multilayer software stack that permits the vehicle to operate at least in part, and in some cases largely without, human intervention using environmental perception data in conjunction with localization, planning, and vehicle control functions to complete a range of maneuvers and/or other operations within its environment—such as successfully navigate itself to a target destination. In addition to establishing an efficient route to the target destination, on-board executed motion planning may include accounting for the motion of nearby agents (e.g., traffic and/or pedestrians) and the location of static objects, in order to avoid collisions.

SUMMARY

Embodiments of the present disclosure relate to policy prediction-based motion planner systems and methods for autonomous and semi-autonomous systems and applications. Systems and methods are disclosed that in real-time or near real-time may produce a motion planning policy for navigating an ego vehicle based on policy prediction.

In contrast to prior vehicle motion planning methods, the systems and methods described herein provide for a model predictive control (MPC) policy prediction-based motion planner for an ego vehicle or machine. A computer vision-based simulation environment may be executed that constructs a virtual scene within which an ego vehicle operates. The scene may include elements that include at least one path for vehicle traffic, an ego agent (e.g., the ego vehicle) and one or more peripheral agents (e.g., other neighboring vehicles and/or pedestrians proximate to the ego agent). Using a multimodal prediction model, a scenario tree structure may be generated that represents potential behaviors of the peripheral agents. The multimodal prediction model jointly predicts trajectory modes for the individual peripheral agents based on environmental perception data that describes the scene from the context of the ego agent. Each predicted trajectory mode may represent a predicted possible behavior of a peripheral agent. The scenario tree structure may be generated by executing a multimodal prediction model that predicts one or more trajectory modes of movement for each peripheral agent over the time span of a planning horizon. Once the scenario tree structure representing the joint set of trajectory modes for the peripheral agent(s) is generated, a joint MPC algorithm optimizes the motion of the ego agent within the context of the scenario tree structure to produce a branch MPC motion planning policy. The output of the joint MPC algorithm may comprise a policy tree structure for planning the motion of an ego vehicle, and may be used as a discrete future-conditioned causal policy plan—accounting for future uncertainty arising from interactions and behaviors of other agents.

To implement the MPC policy prediction-based motion planner, such as described herein, a machine learning model-based MPC policy prediction model may be trained to predict policy tree structures that a joint MPC algorithm would produce given a set of environmental perception data. Real-time or near real-time environmental perception data can be generated using onboard sensors and computing resources to construct a real-time or near real-time dynamic computer vision representation of a scene around the autonomous or semi-autonomous vehicle or machine. The MPC policy prediction-based motion planner may be implemented by training one or more machine learning models to output a prediction of a policy tree structure that would be generated using the joint MPC algorithm given an input representing the environmental perception data. In some embodiments, an ego vehicle may comprise a multilayer software stack, which may include an MPC policy prediction-based motion planner incorporating a trained MPC policy prediction model. The MPC policy prediction-based motion planner may receive environmental perception data representing a scene around the ego vehicle, and based on that input predict a policy tree structure that may be used to define a motion policy for navigating the ego vehicle through the scene.

BRIEF DESCRIPTION OF THE DRAWINGS

The present systems and methods for a policy prediction-based motion planner for autonomous and semi-autonomous systems and applications are described in detail below with reference to the attached drawing figures, wherein:

FIG. 6 is a flow chart illustrating a method for generating a policy tree structure for a joint MPC motion policy, in accordance with some embodiments of the present disclosure;

FIG. 7 is a flow chart illustrating a method for an MPC policy prediction-based motion planner, in accordance with some embodiments of the present disclosure;

DETAILED DESCRIPTION

Figure 1:
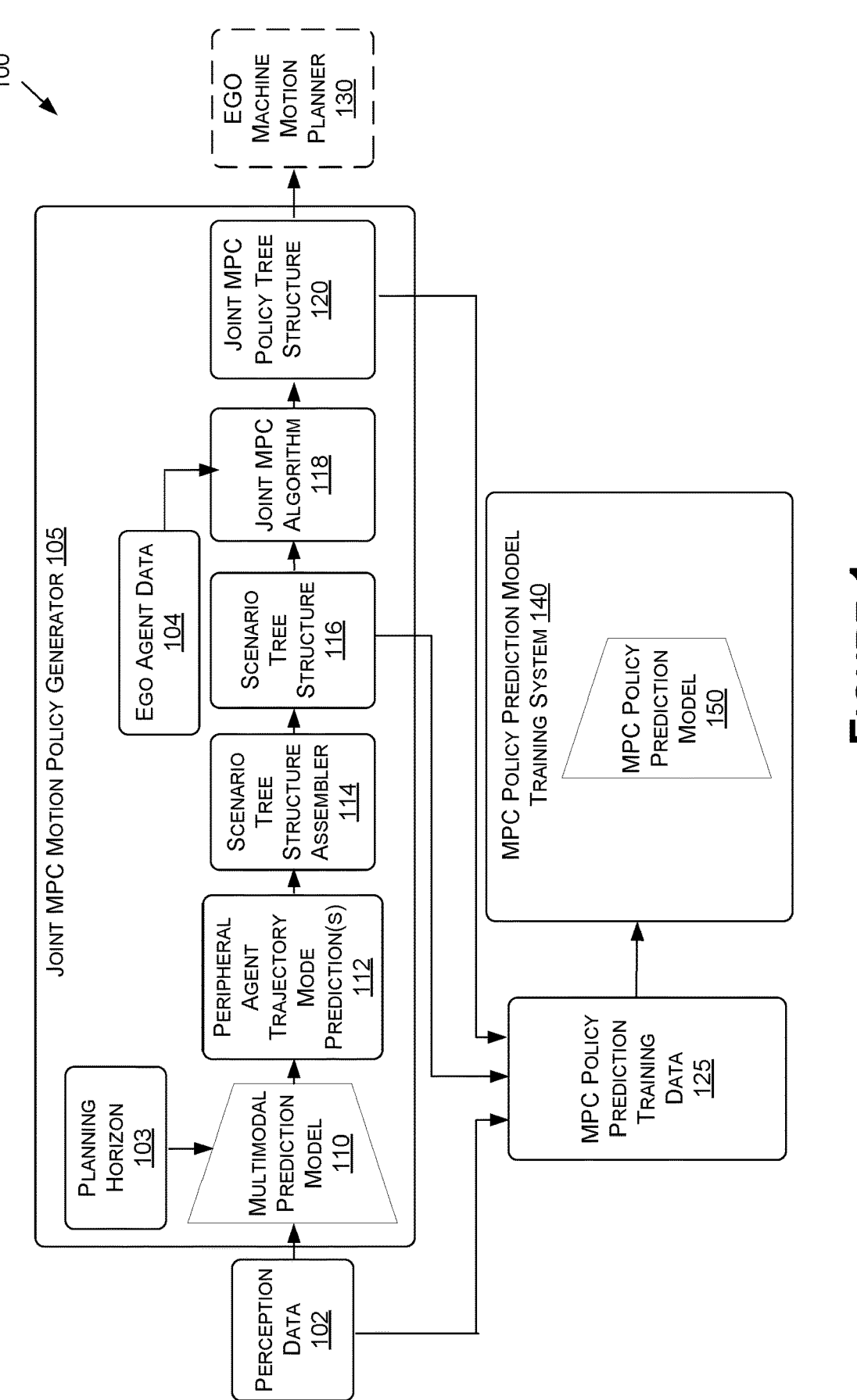
FIG. 1 is a data flow diagram for an example policy prediction-based motion planner system, in accordance with some embodiments of the present disclosure.

Systems and methods are disclosed related to policy prediction-based motion planner systems and methods for autonomous and semi-autonomous systems and applications. Although the present disclosure may be described with respect to an example autonomous or semi-autonomous vehicle or machine 800 (alternatively referred to herein as "vehicle 800," "ego vehicle 800," "machine 800," or "ego machine 800," an example of which is described with respect to FIGS. 8A-8D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to motion planning for autonomous machines, this is not intended to be limiting, and the systems and methods described herein may be used in augmented reality, virtual reality, mixed reality, robotics, security and surveillance, autonomous or semi-autonomous machine applications, and/or any other technology spaces where motion planning may be used.

Ego vehicles often use computer vision technologies to develop an understanding of the details in their surroundings. Ego vehicles may assess the multimodal behavior of neighboring agents within a computer vision or perception representation of their surrounding environment (e.g., the surrounding scene) to plan for their own motion trajectories. Uncertainty in motion planning and decision-making for autonomous or semi-autonomous driving is primarily driven by the unknown intentions and behaviors of the other agents, and several technologies have been developed to provide for motion planning in such environments.

As an example, a partially observable Markov decision process (POMDP) is a process that can be used to optimally model the behaviors of neighboring agents for motion planning. However, POMDP is highly computationally intensive and therefore impractical for use in implementing the real-time or near real-time motion planning that would be used in the context of an ego vehicle. For example, POMDP and/or other computationally intensive (e.g., gradient-based and/or iterative optimization) algorithms are not suitable for execution using onboard computing resources (such as GPUs and/or neural networks) to produce motion planning policy solutions in real-time or near real-time because of the intensive computations involved in producing the solutions.

Current motion planning technologies that may be more suitable for real-time or near real-time applications are substantially based on trajectory planning. With trajectory planning, a trajectory for the ego vehicle is produced that comprises a sequence of waypoints that the vehicle's control system can follow to navigate towards a target destination. For example, trajectory planning may compute a set of potential trajectories for the vehicle to follow based on avoiding other agents and/or objects in the scene, and sample the set of potential trajectories to arrive at a trajectory that the ego vehicle is controlled to follow. The selected trajectory may be executed over a finite time execution horizon. A new trajectory may then be computed (a process referred to as trajectory replanning) that takes into consideration the updated position of the ego vehicle and updated position of the other neighboring agents in the scene to execute over the next finite time execution horizon. In some instances the planning horizon for the set of potential trajectories may have a longer time duration than the time duration of the execution horizon.

Tree-structured policy planning (TPP) represents an example of a trajectory-based motion planning technology that samples a set of potential trajectories to generate a trajectory tree. The resulting trajectory tree is in turn fed to a prediction model for ego-conditioned prediction to generate a scenario tree (e.g., a fixed branching structure) that may be used to derive a motion policy for the vehicle. As another example, a motion policy for an ego vehicle may be obtained from a set of potential trajectories by combining contingency planning with a high replanning rate. Under contingency planning, a motion policy may include a primary trajectory selected to govern vehicle motion during the execution horizon. The motion policy may further include one or more contingency trajectories that may be applied to govern vehicle motion based on detecting when a planned-for event takes place during the execution horizon. For example, the primary trajectory may be used to control the vehicle to maintain a current lane position and vehicle speed, but if sensors detect an agent unexpectedly moving in front of the vehicle, a contingency trajectory may be executed in place of the primary trajectory to control the vehicle to slow down. That said, sampling-based approaches (such as TPP and contingency planning) do not produce fine-grained trajectories, and there is no optimization performed to ensure that the selected trajectory is the best trajectory to execute within the context of the current scene. Contingency planning only produces plans for contingency actions to addresses a small specific set of scenarios that the ego vehicle might experience. Moreover, the solutions of sampling-based techniques can be sub-optimal in that they do not further account for the influence of the ego vehicle's behavior on the behavior of the other agents (e.g., nudging).

Interactive Joint Planning (IJP) is a proposed technique that applies joint optimization as a way of ego conditioning. For example, a planner may use IJP to optimize simultaneously both for the movement of the ego vehicle and the other agents to model the interaction between them and determine a motion plan for the ego machine while accounting for how the motion plan will impact the behavior of nearby agents. For example, a set of ego motion plan samples may be generated (e.g., comprising hundreds of motion plan samples), and each motion plan sample may be used to predict corresponding agent behaviors that are used to score the sample (e.g., based on collision avoidance and other factors). The highest scoring motion plan may then be implemented. IJP jointly optimizes over the behavior of the ego agent and the other surrounding agents and may leverage deep-learning prediction models as prediction priors that the joint trajectory optimization tries to follow for all agents involved. However, IJP as currently applied does not directly yield a motion policy planning method that an automated vehicle may use to make navigation decisions.

In contrast to these prior vehicle motion planning methods, the systems and methods described herein provide for a model predictive control (MPC) policy prediction-based motion planner for an ego vehicle. The MPC policy prediction-based motion planner may be implemented using a machine learning model that in real-time or near real-time may produce a motion planning policy for navigating an ego vehicle. In some embodiments, a computer vision-based simulation environment may be executed that constructs a virtual scene within which an ego vehicle operates. The scene may include elements that include at least one path for vehicle traffic, an ego agent (e.g., the ego vehicle) and one or more peripheral agents (e.g., other neighboring vehicles and/or pedestrians proximate to the ego agent). Using a multimodal prediction model, a scenario tree structure may be generated that represents potential behaviors of the peripheral agents. The multimodal prediction model jointly predicts trajectory modes for the individual peripheral agents based on environmental perception data that describes the scene from the context of the ego agent. Such a multimodal motion prediction model may be trained to input environmental perception data that represents, for example, the location, speed, and trajectory of each of the peripheral agents and the ego agent, and within the context of the scene, generate multiple trajectory mode predictions for the individual agents of the set of the peripheral agents.

Each predicted trajectory mode may represent a predicted possible behavior of a peripheral agent, such as whether the agent will turn, veer left or right, change lanes, remain traveling in a straight direction, and/or whether they will maintain or change speed. A trajectory mode prediction may further include a confidence level with each trajectory mode prediction indicating a confidence the multimodal prediction model has that the prediction is accurate. Motion prediction can thus be used to predict for each peripheral agent multiple trajectory modes, each representing a course of travel over a predetermined planning horizon for the entire scene, and a scenario tree structure constructed that jointly represent a joint multi-mode prediction for the set of peripheral agents. For example, the scenario tree structure may be generated by executing a multimodal prediction model that predicts one or more trajectory modes of movement for each peripheral agent over the time span of a planning horizon.

Once the scenario tree structure representing the joint set of trajectory modes for the peripheral agent(s) is generated, a joint MPC algorithm optimizes the motion of the ego agent within the context of the scenario tree structure to produce a branch MPC motion planning policy. The joint MPC algorithm may apply a gradient-based MPC optimization that jointly optimizes over all modes and for all agents (the ego agent and the peripheral agent(s)) to account for interactive behavior (such as allowing the ego vehicle to nudge peripheral agents to slightly alter their trajectories, hence allowing for human-like interactions). A joint MPC optimization may account for both interactive behavior between ego agent and peripheral agents, such as might occur from nudging and/or lane merging behaviors. In other words, whereas standard gradient-based methods do not provide ego conditioning, the joint MPC algorithm performed using the scenario tree structure extends the concept of IJP by jointly optimizing over some (e.g., all) agents in the scene to obtain an ego-conditioned scene evolution. The output of the joint MPC algorithm may comprise a policy tree structure for planning the motion of an ego vehicle, and may be used as a discrete future-conditioned causal policy plan—accounting for future uncertainty arising from interactions and behaviors of other agents.

Because the policy tree structure is optimized for potential behaviors simultaneously occurring between the set of agents within the scene, the branches of a policy tree structure are optimized to avoid occurrences where following a branch of the policy tree structure in response to the behavior of a first peripheral agent may cause the ego vehicle to collide with a second peripheral agent. Moreover, because of the joint and interactive nature of the policy tree structure, the ego vehicle may be able to initiate a behavior based on a statistical probability that the second peripheral agent may react to nudging by the ego vehicle (e.g., to change its own behavior to react to the ego vehicle and slow down or otherwise change its own trajectory to avoid a collision).

As previously mentioned, gradient-based and/or iterative optimization algorithms can produce fine-grained motion plans but are computationally intensive and therefore may be impractical for use in implementing onboard real-time or near real-time motion planning that would be used in the context of an ego vehicle. As such, to implement the MPC policy prediction-based motion planner as described herein using a gradient-based MPC optimization that jointly optimizes over all modes and for all agents, a machine learning model-based MPC policy prediction model may be trained to predict policy tree structures that a joint MPC algorithm would produce given a set of environmental perception data. For onboard real-time or near real-time motion planning, real-time or near real-time environmental perception data can be generated using onboard sensors and computing resources to construct a real-time or near real-time dynamic computer vision or perception representation of a scene around the autonomous or semi-autonomous vehicle that includes features that represent the peripheral agents as well as other features of the scene around an ego vehicle or machine-such as static objects, drivable surfaces, and/or individual driving lanes on those surfaces.

An MPC policy prediction-based motion planner to generate in real-time a motion policy may be implemented by training one or more machine learning models to output a prediction of a policy tree structure that would be generated by the joint MPC algorithm given an input representing the environmental perception data. An MPC policy prediction-based motion planner comprising such a trained machine learning model may be executed by onboard processing resources to dynamically generate policy tree structures in real-time or near real-time, based on environmental perception data derived from onboard sensor data in real-time or near real-time, without actually having to compute the joint MPC algorithm in real-time or near real-time. In some embodiments, a sample of training data for training the one or more machine learning models of the MPC policy prediction-based motion planner may include, for example, environmental perception data corresponding to a computer vision representation of a scene around the ego vehicle, data representing the scenario tree structure output from a multimodal motion prediction model, and/or a policy tree structure generated by the joint MPC algorithm described herein.

In some embodiments, an ego vehicle may comprise a multilayer software stack, which may include an MPC policy prediction-based motion planner incorporating a trained MPC policy prediction model, as described above. The MPC policy prediction-based motion planner may receive environmental perception data representing a scene around the ego vehicle, and based on that input, predict a policy tree structure that may be used to define a motion policy for navigating the ego vehicle through the scene. The MPC policy prediction-based motion planner may generate a policy tree structure equivalent to one that would be produced by a joint MPC algorithm, while avoiding the need to expend the onboard computational resources that would otherwise be consumed by actually computing the joint MPC algorithm. Moreover, because the MPC policy prediction-based motion planner is trained to predict how the joint MPC algorithm would respond to a given configuration of peripheral agents within a set of environmental perception data, the MPC policy prediction-based motion planner may produce a policy tree structure for newly encountered scenario configurations that are beyond the scope of what was included in its training data.

It should be appreciated that the embodiments described herein may be used in the context of motion planning for ego machine and ego vehicles such as automobiles, trucks, trains, aircraft, spacecraft, and/or boats, and may be extended to other machinery such as remotely operated and/or autonomous devices (e.g., robots and drones), and other industrial and/or construction machinery.

With reference to FIG. 1, FIG. 1 is an example data flow diagram for a policy prediction-based motion planner system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionalities to those of example autonomous vehicle 800 of FIGS. 8A-8D, example computing device 900 of FIG. 9, and/or example data center 1000 of FIG. 10.

As shown in FIG. 1, system 100 includes a joint MPC motion policy generator 105 that generates a joint MPC policy tree structure 120 based on an input of perception data 102 that describes a scene from the context of an ego agent, such as autonomous or semi-autonomous vehicle or machine 800. In some embodiments, perception data 102 may be generated, for example, using computer vision or perception technologies (e.g., computer vision algorithms, deep learning algorithms, machine learning algorithms, etc.) that render a computer vision or perception representation of an environment around the autonomous or semi-autonomous vehicle or machine 800. Perception data 102 may be generated using onboard sensors and computing resources (such as described with respect to FIGS. 8A-8D) to construct a real-time or near real-time dynamic computer vision representation of the scene that includes features (e.g., objects) that represent the peripheral agents as well as other features of the scene around the ego vehicle such as static objects, drivable surfaces, and/or individual driving lanes on those surfaces. The environmental perception data 102 may include, for example, the location, speed, and trajectory of each of one or more peripheral agents and the ego agent. In some embodiments, perception data 102 may include synthesized data describing a scene from the context of an ego agent, for example, a three-dimensional ego-conditioned rendering of a simulated driving environment that includes the ego agent, one or more peripheral agents, and/or other features of the scene.

As shown in FIG. 1, the joint MPC motion policy generator 105 comprises a multimodal prediction model 110 that inputs the perception data 102 and generates motion predictions as peripheral agent trajectory mode predictions 112 for each of the peripheral agents in the scene around the ego agent. The motion predictions may span a predetermined planning horizon, and/or the multimodal prediction model 110 may receive a selectable planning horizon 103 input that defines the planning horizon over which the peripheral agent trajectory mode predictions 112 are generated. The peripheral agent trajectory mode predictions 112 may be processed by a scenario tree structure assembler 114 to produce a scenario tree structure 116 representing a joint scenario tree inclusive of each of the peripheral agents.

Using the peripheral agent trajectory mode predictions 112, a scenario tree structure 116 may be generated that represents potential behaviors of the peripheral agents over the span of the planning horizon. The multimodal prediction model 110 may jointly predict trajectory modes for the individual peripheral agents based on environmental perception data 102 that describes the scene from the context of the ego agent. In some embodiments, such a multimodal prediction model 110 may be trained to input environmental perception data 102 that represents, for example, the location, speed, and trajectory of each of the peripheral agents and the ego agent, and within the context of the scene generate multiple trajectory mode predictions for the individual agents of the set of the peripheral agents. Each individual predicted trajectory mode included in the peripheral agent trajectory mode predictions 112 may represent a predicted possible behavior of a peripheral agent, such as whether the agent will turn, veer left or right, change lanes, remain traveling in straight direction, and/or whether they will maintain or change speed. A trajectory mode prediction may further include a confidence level indicating a confidence the multimodal prediction model 110 has that the prediction is accurate. Motion prediction can thus be used for each peripheral agent to predict multiple trajectory modes, each mode representing a course of travel over the planning horizon for the entire scene. A scenario tree structure 116 may then be constructed that jointly represents an overall joint multi-mode prediction for the set of peripheral agents. In some embodiments, the multimodal prediction model 110 may include one or more deep-learning prediction models (e.g., implemented using a Convolutional Neural Network (CNN), Deep Neural Network (DNN) and/or other neural network architecture) trained to produce the peripheral agent trajectory mode predictions 112. Further details regarding the generation of scenario trees using prediction models are described in the referenced article: Y. Chen, P. Karkus, B. Ivanovic, X. Weng, and M. Pavone, "Tree-structured policy planning with learned behavior models," IEEE International Conference on Robotics and Automation, pp. 7902-7908, 27 Feb. 2023, which is incorporated herein by reference in its entirety.

Figure 3:
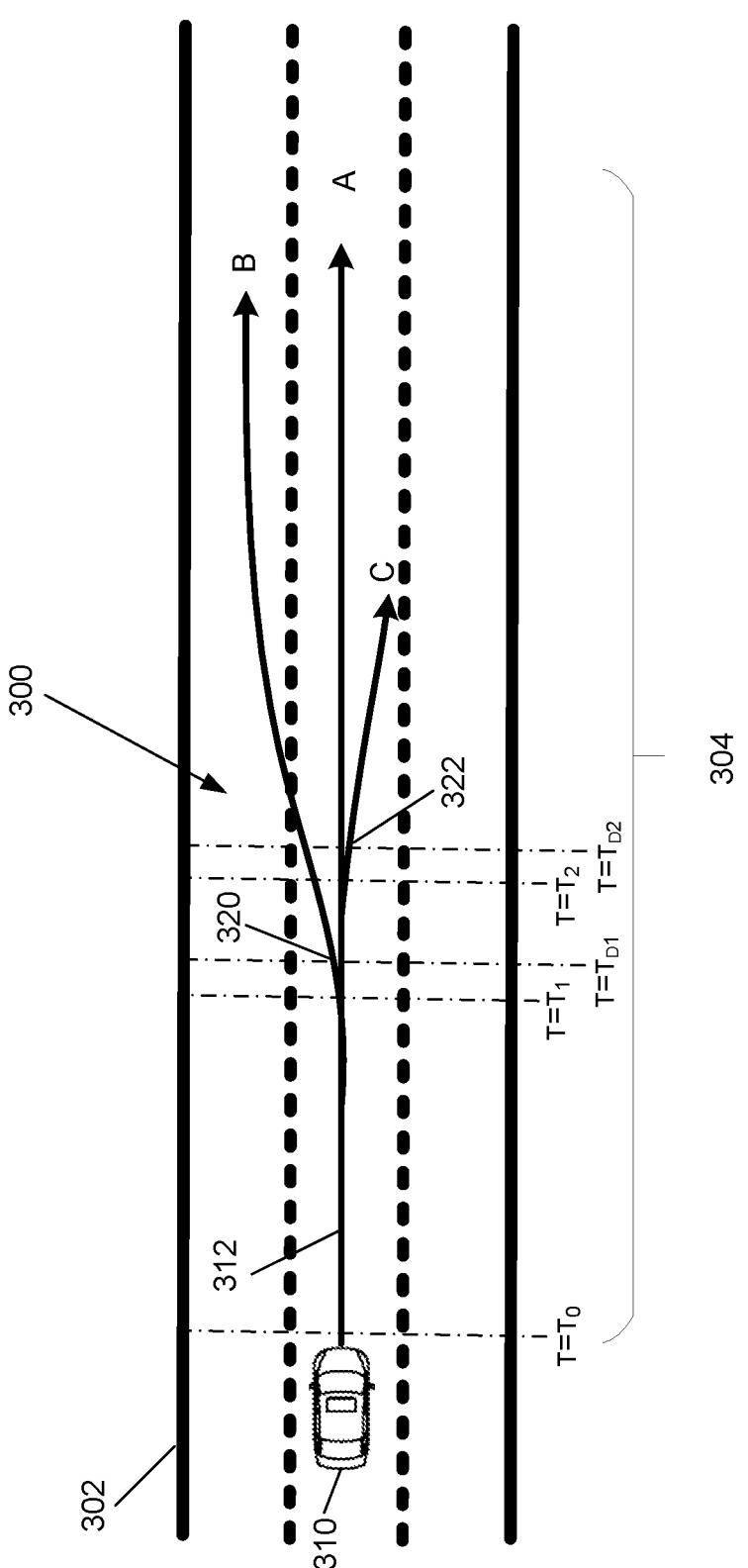
FIG. 3 is a diagram illustrating a peripheral agent trajectory mode prediction for a scenario tree structure, in accordance with some embodiments of the present disclosure.

Referring now to FIG. 3, FIG. 3 illustrates a simplified example of a peripheral agent trajectory mode prediction 300 produced by multimodal prediction model 110, such as may be included in the peripheral agent trajectory mode predictions 112. The scenario tree structure 116 may accordingly comprise a set of individual peripheral agent trajectory mode predictions such as shown in FIG. 3, predicted for different peripheral agents in the scene over the same planning horizon 304. In FIG. 3, the trajectory mode prediction 300 for a peripheral agent 310 is shown in the context of a multi-lane roadway 302 for illustration purposes. For example, for a given peripheral agent, the multimodal prediction model may predict three trajectory mode predictions over the planning horizon, shown in FIG. 3 as modes A, B, and C. Branches in the scenario tree structure 116 may be generated based on when a divergence appears (as shown at 320) between the predicted trajectory modes A, B, and C of the trajectory mode prediction 300.

At the beginning of the planning horizon 304 ($t=t_0$), the multimodal prediction model 110 may be expected to generate modes A, B, and C that predict the peripheral agent 310 to be at its current location within the scene. As shown in FIG. 3, all of the trajectory modes A, B, and C for peripheral agent 310 should overlap to form an initial trunk 312 of the trajectory mode prediction 300 at this initial point on the planning horizon. As time along the planning horizon 304 progresses, the predicted trajectory modes A, B, and C may begin to diverge with respect to the peripheral agent's predicted direction of motion and/or velocity. Branches (e.g., at 320 and 322) are formed based on the point of time in the planning horizon 304 where the divergence between two or more of the predicted trajectory modes reaches a substantially significant divergence such that they can be distinguished from each other.

In the example of FIG. 3, for trajectory mode A, the multimodal prediction model 110 predicts that peripheral agent 310 remains traveling in a straight direction within in its current lane throughout the duration of the planning horizon 304. For trajectory mode B, the multimodal prediction model 110 predicts that peripheral agent 310, at point $t=t_1$ of the planning horizon 304, begins to change lanes by moving left from its current position and speeding up. For trajectory mode C, the multimodal prediction model 110 predicts that peripheral agent 310, at point $t=t_2$ of the planning horizon 304, begins to change lanes by moving right from its current position and slowing down. As such, for this example, at point $t=t_0$ of the planning horizon the trajectory modes A, B, and C would all align and be indistinguishable from each other. Beginning at point $t=t_1$, the trajectory mode B prediction will begin to diverge with respect to the A and C trajectory mode predictions. Once the magnitude of this divergence reaches a predetermined significance threshold (e.g., which may be set in software using a hyper parameter), a mode divergence branch 320 is formed on the scenario tree structure (e.g., at point $t=t_{d1}>t_1$) representing the leftward movement and speed increase of the peripheral agent predicted according to the second trajectory mode prediction. Further into the planning horizon at point $t=t_2$, the trajectory mode C prediction may begin to diverge right with respect to the trajectory mode A prediction. Once the magnitude of this second divergence reaches a predetermined significance threshold, a mode divergence branch 322 is formed (e.g., at point $t=t_{d2}>t_2$) representing the rightward movement and speed decrease of the peripheral agent predicted according to the third trajectory mode prediction.

The resulting peripheral agent trajectory mode prediction 300 produced by multimodal prediction model 110 for this peripheral agent 310 may be combined with the peripheral agent trajectory mode predictions produced for the other individual peripheral agents present in the scene described by the perception data 102 to form a scenario tree structure 116 that accounts for the movements of the plurality of peripheral agents. For example, the scenario tree structure 116 comprises a joint tree structure with branching representing the distinct predicted trajectory modes corresponding to the set of peripheral agents included in the scene represented by the perception data 102—based on scene-level mode divergence, and which may be used to facilitate executing a closed-loop motion planning policy without replanning.

Returning to FIG. 1, as shown, the joint MPC motion policy generator 105 may further comprise a joint MPC algorithm 118 that inputs the scenario tree structure 116 and ego agent data 104 to generate a joint MPC policy tree structure 120. For example, once the scenario tree structure 116 representing the joint set of trajectory modes for the peripheral agent(s) is generated, the joint MPC algorithm 118 optimizes the motion of the ego agent within the context of the scenario tree structure 116 (e.g., based on ego agent data 104 that describes position, velocity, and/or other information regarding the state of the ego agent within the context of the scene) to produce a branch MPC motion planning policy in the form of a joint MPC policy tree structure 120. In some embodiments, the joint MPC algorithm 118 may apply a gradient-based MPC optimization that jointly optimizes over all modes and for all agents in the scene (the ego agent and the one or more peripheral agent(s)). The gradient-based MPC optimization may account for interactive behaviors such as allowing the ego agent to nudge peripheral agents to slightly alter their trajectories, hence accounting for human-like interactions. The joint MPC optimization may account for both interactive behavior between ego agent and peripheral agents, such as might occur from nudging and/or lane merging behaviors. The output of the joint MPC algorithm 118 may thus comprise a policy tree structure 120 that may be used for planning the motion of an ego vehicle 800, and may be used by the ego vehicle as a discrete future-conditioned causal policy plan—accounting for future uncertainty arising from interactions and behaviors of other agents in its environment.

Figure 4:
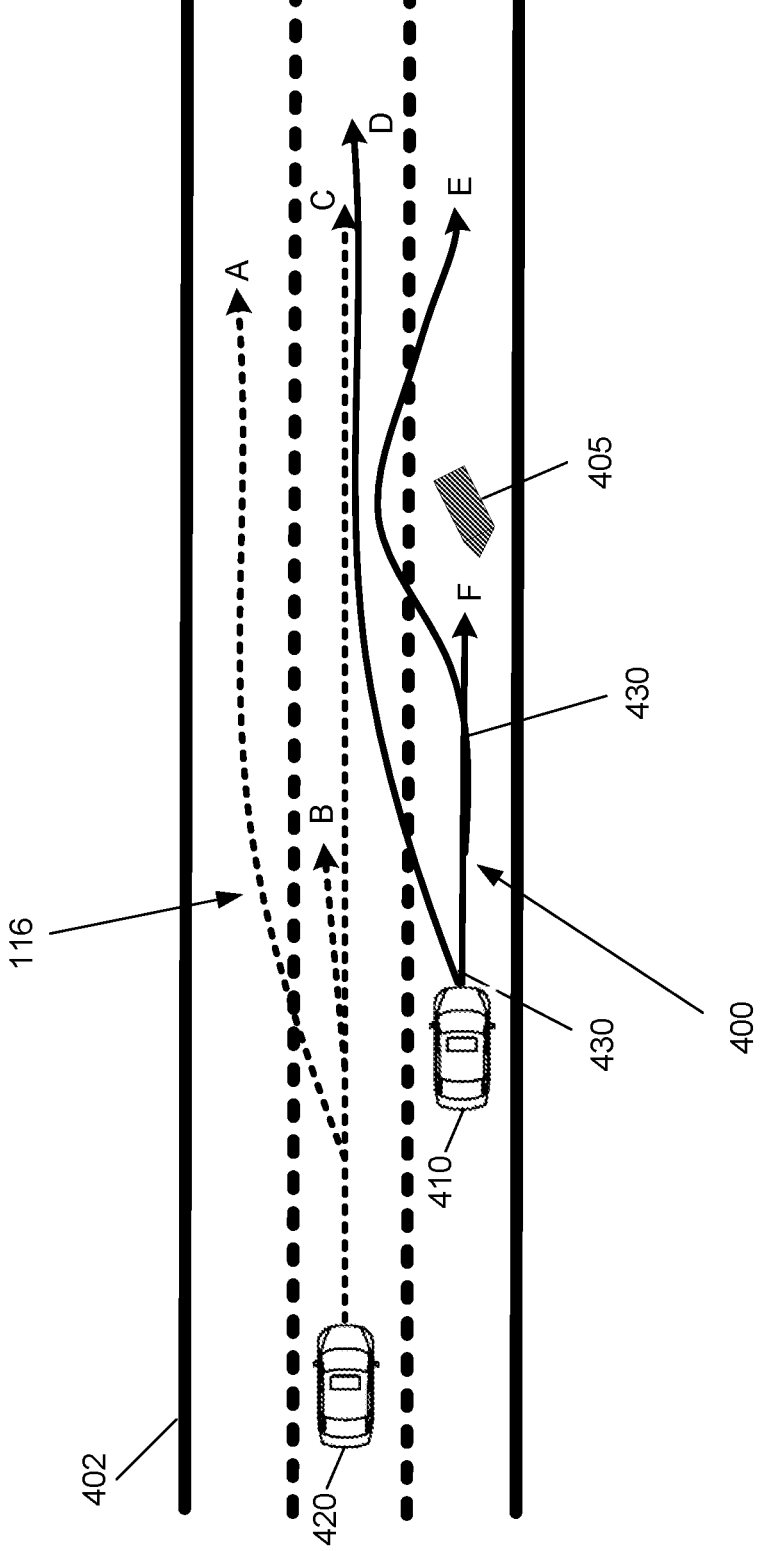
FIG. 4 is a diagram illustrating a motion policy based on a joint MPC policy tree structure, in accordance with some embodiments of the present disclosure.

For example, as shown in FIG. 4, a joint MPC-derived policy tree structure 400 (such as the policy tree structure 120 produced by the joint MPC algorithm 118) may comprise an ego-conditioned tree describing a motion policy for an ego vehicle 400 (such as ego vehicle 800) that includes branches 430 corresponding to potential reactions of the ego vehicle 400 to branches of the scenario tree structure 116. For example, each branch 430 of the policy tree structure 400 may provide a scenario-specific behavior adjustment for the ego vehicle 400 that corresponds to a set of peripheral agents (considered as a whole) following one pattern of trajectory modes versus another.

In some embodiments, to produce the policy tree structure 400, the joint MPC algorithm 118 may iteratively advance through time steps of the planning horizon for the scenario tree structure 116, identifying distinguishable branches in the scenario tree structure 116 (e.g., deviations in excess of a threshold) that occur within that time step, and optimizing the trajectory of the ego vehicle 400 within that time step against those of the peripheral agents indicated by the distinguishable branches to evaluate what branching of the policy tree structure 400 (if any) is to be included at that time step.

For example, in FIG. 4, the example ego vehicle 410 is traveling in a lane of a multi-lane roadway 402, and may need to react to the presence of a detected road hazard 405 in that lane (e.g., detected in a computer vision-generated scene based on environmental perception data 102), while a peripheral agent 420 is also traveling in a neighboring lane. While the behavior of the peripheral agent 420 cannot be determine with absolute certainty, the joint MPC generated policy tree structure 400 for the ego vehicle 410 may include, for example, branches 430 that correspond to predicted trajectory modes A, B, and C for the peripheral agent 420.

In the example of FIG. 4, in trajectory mode A, the peripheral agent 420 changes lanes, and the policy tree structure 400 includes a corresponding motion policy mode D which would prompt the ego vehicle 410 to change lanes to avoid the hazard, 405.

For the trajectory mode B, the peripheral agent 420 slows down, which provides the ego vehicle 410 with ample time and clearance to change lanes, and the policy tree structure 400 includes a corresponding motion policy mode E to prompt ego vehicle 410 to change lanes in front of the peripheral agent 420 to avoid the hazard 405.

For the trajectory mode C, the peripheral agent 420 maintains a course that blocks the ego vehicle 410 from changing lanes, and the policy tree structure 400 includes a corresponding motion policy mode F to prompt the ego vehicle 420 to slow down and/or stop within its lane to avoid the hazard 405.

A policy tree structure 120 (such as policy tree structure 400) thus defines a joint motion policy plan from which the ego vehicle can react to multimodal behaviors of the other agents within its environment. In some embodiments, the policy tree structure 120 may include a confidence (e.g., probability) score associated with individual branches so that when more than one branch appears to potentially respond to changes in the environmental perception data, the policy tree structure 400 provides a way for alternate possible reactions to be ranked and selected by downstream components that use the policy tree structure 120 (e.g., ego machine motion planner 130). Because the policy tree structure 120 produced by the joint MPC algorithm 118 is optimized for potential behaviors simultaneously occurring between the set of agents within the scene, the branches of policy tree structure 120 are optimized to avoid occurrences where following a branch of the policy tree structure 120 in response to the behavior of a first peripheral agent may cause the ego vehicle to collide with a second peripheral agent. Moreover, because of the joint and interactive nature of the policy tree structure 120, the ego vehicle 800 may be able to initiate a behavior based on a statistical probability that the second peripheral agent may react to nudging by the ego vehicle (e.g., to change its own behavior to react to the ego vehicle and slow down or otherwise change its own trajectory to avoid a collision).

Referring again to FIG. 1, as shown in FIG. 1, in some embodiments a joint MPC policy tree structure 120 may be used as an input to an ego machine motion planner 130 for an ego vehicle (such as ego vehicle 800) to implement a motion policy to control the movements and navigation of the ego vehicle. That said, the gradient-based iterative optimization algorithms executed by the joint MPC algorithm 118 are computationally intensive and therefore may be impractical to execute for the real-time motion planning that would be used in the context of navigating an ego vehicle. As such, to implement the MPC policy prediction-based motion planner as described herein, a machine learning model may be trained to predict policy tree structures that a joint MPC algorithm may be expected to produce given a set of environmental perception data. The trained machine learning model may then be implemented in the multilayer software stack of an ego vehicle 800 as an MPC policy prediction model 150 that can generate joint MPC policy tree structures for input to the ego machine motion planner 130 using less onboard compute (in terms of computing resources and time) than would be consumed by executing gradient-based iterative optimization algorithms. For example, an MPC policy prediction-based motion planner that may be used onboard an ego vehicle to generate in real-time a motion policy may be implemented by training one or more machine learning models to implement an MPC policy prediction model 150. Such a trained MPC policy prediction model 150 may be executed by onboard processing resources to dynamically generate policy tree structures in real-time, based on environmental perception data derived from onboard sensor data in real-time, without actually having to compute the joint MPC algorithm in real-time.

Accordingly, in some embodiments, a set of MPC policy prediction training data 125 may be produced using perception data 102, and one or both of scenario tree structures 116 and joint MPC policy tree structures 120 are produced by the joint MPC motion policy generator 105 for that perception data 102. For example, a sample of MPC policy prediction training data 125 may comprise a sample of perception data 102 and the scenario tree structure 116 and/or the joint MPC policy tree structure 120 generated from that sample of perception data 102. As shown in FIG. 1, the policy prediction-based motion planner system 100 may include an MPC policy prediction model training system 140 that trains the MPC policy prediction model 150 based on the MPC policy prediction training data 125, as further detailed with respect to FIG. 2.

Figure 2:
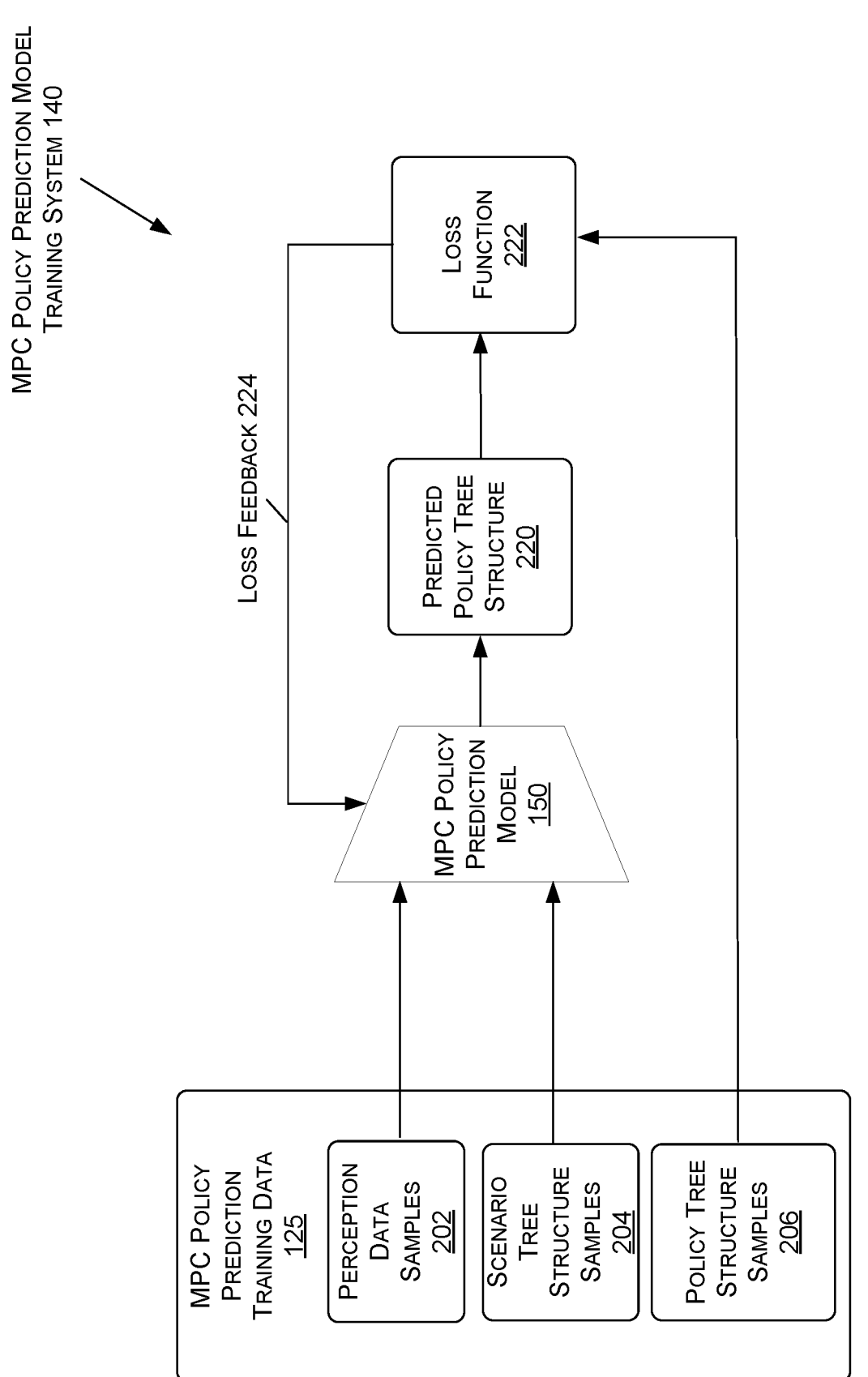
FIG. 2 is a diagram illustrating an MPC policy prediction model training system, in accordance with some embodiments of the present disclosure.

Referring now to FIG. 2, FIG. 2 illustrates an example MPC policy prediction model training system 140 according to some embodiments. The MPC policy prediction training data 125 may at least comprise perception data samples 202 that include samples of perception data 102 and policy tree structure samples 206 that include the corresponding samples of policy tree structures 120 generated by the joint MPC motion policy generator 105 from the perception data 102. In some embodiments, the MPC policy prediction training data 125 may include scenario tree structure samples 204 generated by the joint MPC motion policy generator 105 from the perception data 102 over the same planning horizon as the policy tree structure samples 206. In some embodiments, perception data samples 202 may comprise samples of environmental perception data 102 produced from sensor data captured by one or more sensors of an ego vehicle 800 while driving through an environment. In some embodiments, perception data samples 202 may comprise samples of environmental perception data 102 that includes synthesized data, for example a three-dimensional ego-conditioned rendering of a simulated driving environment that includes the ego agent, one or more peripheral agents, and/or as other features of the scene. In some embodiments, environmental perception data 102 for producing MPC policy prediction training data 125 may be generated, for example, using a driving simulation platform that runs a set of simulations of different scenarios (e.g., several thousands to millions of scenarios) comprising diverse scenes with varying configurations of roadways, potential roadway hazards, and numbers and arrangements of peripheral agents around the ego agent.

To train the MPC policy prediction model 150 with the MPC policy prediction model training system 140, in some embodiments a perception data sample 202 may be input to the MPC policy prediction model 150, and a resulting predicted policy tree structure 220 output from the MPC policy prediction model 150 compared against corresponding actual policy tree structure sample 206 computed by the joint MPC algorithm 118 from that perception data sample 202. The predicted policy tree structure 220 and policy tree structure sample 206 may be input to a loss function 222 to measure a difference between the predicted policy tree structure and the training sample policy tree structure, and a loss score may be computed based on a difference that represents an accuracy of the MPC policy prediction model 150's prediction. The loss score may be used to produce a loss feedback 224 to iteratively adjust the MPC policy prediction model 150 over the course of training to iteratively reduce the loss score and converge on a configuration of the MPC policy prediction model 150 that accurately produces predicted policy tree structures 220 outputs that match the policy tree structure sample 206 of the training data 125. In some embodiments, the MPC policy prediction model 150 may be trained by further using the scenario tree structure samples 204 as additional training inputs to the MPC policy prediction model 150 to aid in training the MPC policy prediction model 150 to accurately produce the predicted policy tree structures 220.

Figure 5:
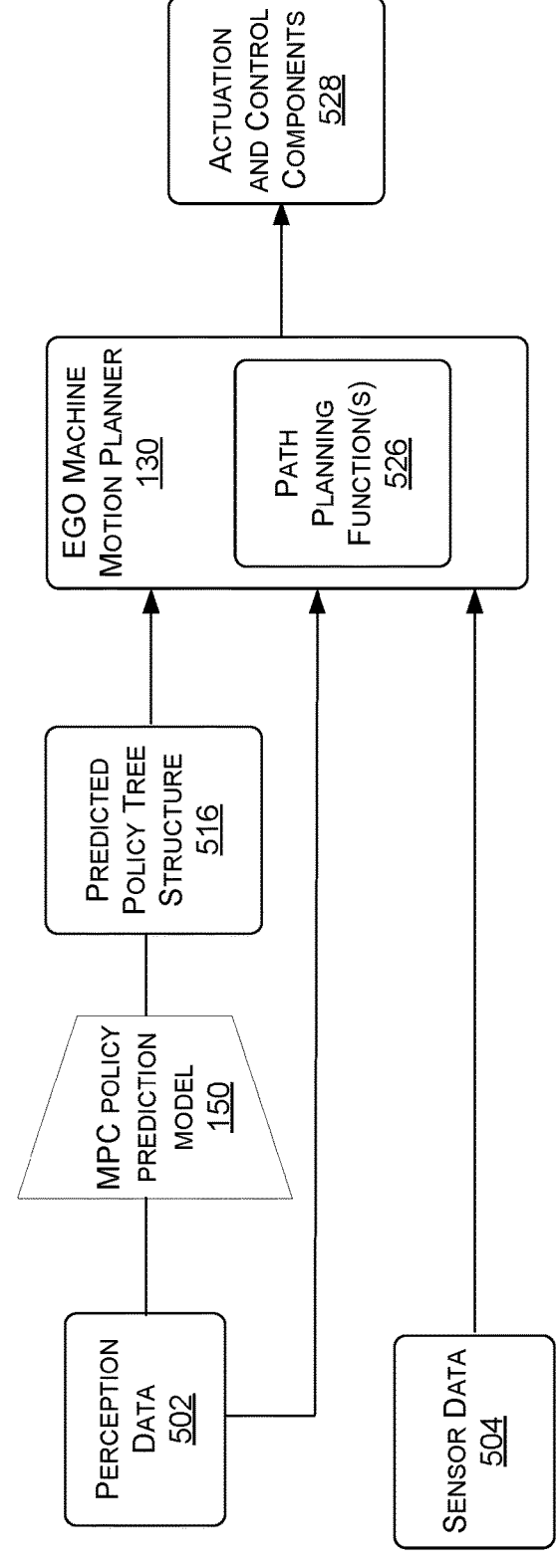
FIG. 5 is a diagram illustrating an MPC policy prediction-based motion planner incorporating a trained MPC policy prediction model, in accordance with some embodiments of the present disclosure.

Referring now to FIG. 5, FIG. 5 illustrates a trained MPC policy prediction model 150, which may be trained as described herein and incorporated into a multilayer software stack for operating an ego vehicle 800. For example, an ego vehicle 800 may comprise a multilayer software stack that includes an MPC policy prediction-based motion planner 500 incorporating a trained MPC policy prediction model 150 as described herein. The MPC policy prediction model 150 may receive environmental perception data 502 representing a scene around the ego vehicle (e.g., computed from sensor data 504 from one or more vehicle sensors as discussed with respect to FIGS. 8A to 8D), and based on that input, predicts a policy tree structure 516 that may be used to define a motion policy for navigating the ego vehicle 800 through its environment in the presence of other agents operating in that environment. MPC policy prediction model 150 may generate a policy tree structure 516 equivalent to one that would be produced by a joint MPC algorithm 118, while avoiding the need to expend the onboard computational resources that would otherwise be consumed by actually computing the joint MPC algorithm 118. Moreover, because the MPC policy prediction-based motion planner is trained to predict how the joint MPC algorithm would respond to a given configuration of peripheral agents as indicated by a set of environmental perception data, the MPC policy prediction model 150 may produce a policy tree structure 516 for newly encountered scenarios beyond the scope of training data 125 used to train the MPC policy prediction model 150.

The policy tree structure 516 may be used by one or more downstream navigation components of the ego machine, such as the controller(s) 836 discussed below. As shown in FIG. 5, the policy tree structure 516 may be used as an input to the ego machine motion planner 130 for ego vehicle 800 to implement a motion policy to control the movements and navigation of the ego vehicle. The ego machine motion planner 130 and/or other downstream navigation components, for example, may implement object avoidance navigation functions and/or a world model manager, a path planner, a control component, a localization component, an obstacle avoidance component, an actuation component, and/or the like, to perform operations for controlling the ego machine through an environment. For some embodiments, the downstream navigation components may include at least one or more path planning functions 526 (such as the path planning functions discussed herein with respect to ego machine 800) and actuation and control components 528 (such as the steering or break actuators or other controllers discussed herein with respect to ego machine 800). For example, the path planning functions 526 may include a configuration space manager, a freespace manager, a reachability manager, and a path evaluator. The configuration space manager may manage a pose configuration space, which represents poses comprising positions and orientations of the ego machine in its environment. The path evaluator may identify one or more proposed or potential paths for the vehicle based at least on the assessment by the reachability manager. The path planning functions 526 may use policy tree structure 516 for motion planning, for example, to plan a path of travel for the ego vehicle that avoids collisions with other moving agents and/or obstacles in the environment around the ego vehicle. Because the policy tree structure 516 comprises a prediction of an optimized MPC joint policy tree structure (such as a joint MPC policy tree structure computed using a joint MPC algorithm), the predicted policy tree structure 516 is effectively optimized to address potential behaviors simultaneously occurring between the agents within the scene, with branches of the predicted policy tree structure 516 effectively optimized to avoid occurrences where following a branch of the predicted policy tree structure 516 in response to the behavior of a first peripheral agent may cause the ego vehicle 800 to collide with a second peripheral agent. Moreover, because of the joint and interactive nature of the predicted policy tree structure 516, an ego vehicle 800 performing motion planning based on the predicted policy tree structure 516 may be able to initiate a behavior based on a statistical probability that the second peripheral agent may react to nudging by the ego vehicle (e.g., to change its own behavior to react to the ego vehicle and slow down or otherwise change its own trajectory to avoid a collision).

Now referring to FIG. 6, FIG. 6 is a flow diagram showing a method 600 for computing a policy tree structure for a joint MPC motion policy, in accordance with some embodiments of the present disclosure. It should be understood that the features and elements described herein with respect to the method 600 of FIG. 6 may be used in conjunction with, in combination with, or substituted for elements of any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa. Each block of method 600, described herein, comprises a computing process that may be performed using any combination of hardware, firmware, and/or software. For instance, various functions may be carried out by one or more processors comprising processing circuitry to execute instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the system of FIG. 1. However, this method may additionally or alternatively be executed by any one system, or any combination of systems, including, but not limited to, those described herein.

The method 600, at block B602, includes generating a scenario tree structure based at least on perception data corresponding to a representation of a scene that includes at least one path for each of vehicle traffic, an ego agent, and one or more peripheral agents, the scenario tree structure representing a plurality of trajectory modes for the one or more peripheral agents over a planning horizon. As discussed with respect to FIG. 1, in some embodiments, perception data may be generated, for example, using computer vision technologies that render a computer vision representation of an environment around an autonomous vehicle. Perception data may be generated using onboard sensors and computing resources (such as described with respect to FIGS. 8A-8D) to construct a real-time dynamic computer vision representation of the scene that includes features (e.g., objects) that represent the peripheral agents as well as other features of the scene around the ego vehicle such as static objects, drivable surfaces, and/or individual driving lanes on those surfaces. In some embodiments, perception data may include synthesized data describing a scene from the context of an ego agent, for example, a three-dimensional ego-conditioned rendering of a simulated driving environment that includes the ego agent, one or more peripheral agents, and/or other features of the scene. The environmental perception data may include, for example, the location, speed, and trajectory of each of one or more peripheral agents and the ego agent. In some embodiments, a joint MPC motion policy generator 105 may comprise a multimodal prediction model 110 that inputs the perception data and generates motion predictions as peripheral agent trajectory mode predictions for each of the peripheral agents in the scene around an ego agent. The peripheral agent trajectory mode predictions 112 may be processed by a scenario tree structure assembler 114 to produce a scenario tree structure 116 representing a joint scenario tree inclusive of each of the peripheral agents. As described with respect to FIG. 1, using the peripheral agent trajectory mode predictions 112, a scenario tree structure 116 may be generated that represents potential behaviors of the peripheral agents over the span of a planning horizon. The multimodal prediction model 110 may jointly predict trajectory modes for the individual peripheral agents based at least on environmental perception data 102 that describes the scene from the context of the ego agent. A scenario tree structure 116 may then be constructed that jointly represents an overall joint multi-mode prediction for the set of peripheral agents. In some embodiments, branches of the scenario tree structure may be generated based at least on a divergence between at least two trajectory modes of the plurality of trajectory modes. In some embodiments, the method may include predicting the plurality of trajectory modes for the one or more peripheral agents using at least one multimodal motion prediction model that jointly predicts the plurality of trajectory modes. The one or more peripheral agents may represent at least one of a vehicle, a machine, a pedestrian, or an animal. The ego agent may represent at least one of an ego machine or an ego vehicle.

The method 600, at block B604, includes, within the planning horizon, performing a joint model predictive control (MPC) optimization based at least on the scenario tree structure and a trajectory of the ego agent to generate a policy tree structure that represents a motion policy for navigating the ego agent through the scene. In some embodiments, the joint MPC optimization may be performed based at least on the ego agent and the one or more peripheral agents in the scene to generate an ego-conditioned tree for the policy tree structure, wherein one or more branches of the policy tree structure represent a behavior adjustment for the ego agent that corresponds to the plurality of trajectory modes for the one or more peripheral agents as represented by the scenario tree structure. In some embodiments, the method may include iteratively advancing through one or more time steps of the planning horizon using the joint MPC optimization, to identify one or more branches in the scenario tree structure, and optimize the trajectory of the ego agent within a time step of the planning horizon against the one or more branches in the scenario tree structure at the time step to generate one or more branches of the policy tree structure. In some embodiments, using the joint MPC optimization, one or more branches of the policy tree structure may be generated based at least in part on an estimate of an influence of movements of the ego agent on the one or more peripheral agents. One or more machine learning models may be trained to predict the policy tree structure based at least on training data that includes at least one of the perception data and the policy tree structure, such as the MPC policy prediction model 150. The training data may further comprise training samples based at least on the scenario tree structure. During training, the one or more machine learning models may be adjusted based at least on a loss score computed by a loss function, wherein the loss score is computed based at least on a difference between a predicted policy tree structure generated by the machine learning model and a training policy tree structure generated based at least on the joint MPC optimization.

Now referring to FIG. 7, FIG. 7 is a flow diagram showing a method 700 for an MPC policy prediction-based motion planner, in accordance with some embodiments of the present disclosure. It should be understood that the features and elements described herein with respect to the method 700 of FIG. 7 may be used in conjunction with, in combination with, or substituted for elements of any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa. Each block of method 700, described herein, comprises a computing process that may be performed using any combination of hardware, firmware, and/or software. For instance, various functions may be carried out by one or more processors comprising processing circuitry to execute instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 700 is described, by way of example, with respect to the system of FIG. 5. However, this method may additionally or alternatively be executed by any one system, or any combination of systems, including, but not limited to, those described herein.

As discussed herein in greater detail, in some embodiments the method may include generating, using one or more machine learning models, a motion policy for navigating an ego machine through an environment based at least on the one or more machine learning models predicting an output representing a policy tree computed using a gradient-based optimization algorithm in response to an input comprising at least one input of environmental perception data associated with the ego machine.

The method 700, at block B702, includes generating perception data corresponding to a representation of at least a portion of an environment that includes at least an ego agent and one or more peripheral agents. As discussed with respect to FIG. 5, perception data 502 may represent a scene around the ego vehicle computed from sensor data from one or more vehicle sensors discussed with respect to FIGS. 8A to 8D). The perception data may describe a scene from the context of an ego agent, such as autonomous vehicle 800. In some embodiments, the perception data may be generated, for example, using computer vision technologies that render a computer vision representation of an environment around the autonomous vehicle 800. Perception data 102 may be generated using onboard sensors and computing resources to construct a real-time dynamic computer vision representation of the scene that includes features that represent the peripheral agents as well as other features of the scene around the ego vehicle, such as static objects, drivable surfaces, and/or individual driving lanes on those surfaces. The perception data may include, for example, the location, speed, and trajectory of each of one or more peripheral agents and the ego agent.

The method 700, at block B704, using one or more machine learning models, generating a motion policy for navigating an ego machine through the environment based at least on the perception data, wherein to generate the motion policy. To generate the motion policy, the one or more machine learning models are trained to predict a policy tree structure corresponding to a predicted output of a gradient-based optimization configured to jointly optimize trajectories of ego agents and peripheral agents based at least on the perception data. For example, an ego vehicle 800 may comprise a multilayer software stack that includes an MPC policy prediction-based motion planner incorporating a trained MPC policy prediction model 150 as described herein. The MPC policy prediction model may receive the perception data, and based at least on that input, predict a policy tree structure that may be used to define a motion policy for navigating the ego vehicle 800 through its environment in the presence of other agents operating in that environment. In some embodiments, the method may proceed with performing one or more operations to control a movement of the ego machine through the environment based at least on the motion policy. The one or more machine learning models may be trained to predict the policy tree structure based at least on training data that includes at least one of the perception data and the policy tree structure. In some embodiments, the method may include generating a scenario tree structure based at least on the perception data, the scenario tree structure representing a plurality of trajectory modes for the one or more peripheral agents over a planning horizon, and performing a joint model predictive control (MPC) optimization based at least on the scenario tree structure and the trajectory of the ego agent to generate the policy tree structure. In some embodiments, the method may include predicting the plurality of trajectory modes for the one or more peripheral agents using at least one multimodal motion prediction model that jointly predicts the plurality of trajectory modes. Branches of the scenario tree structure may be generated based at least on a divergence between at least two trajectory modes of the plurality of trajectory modes.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Autonomous Vehicle

Figure 8A:
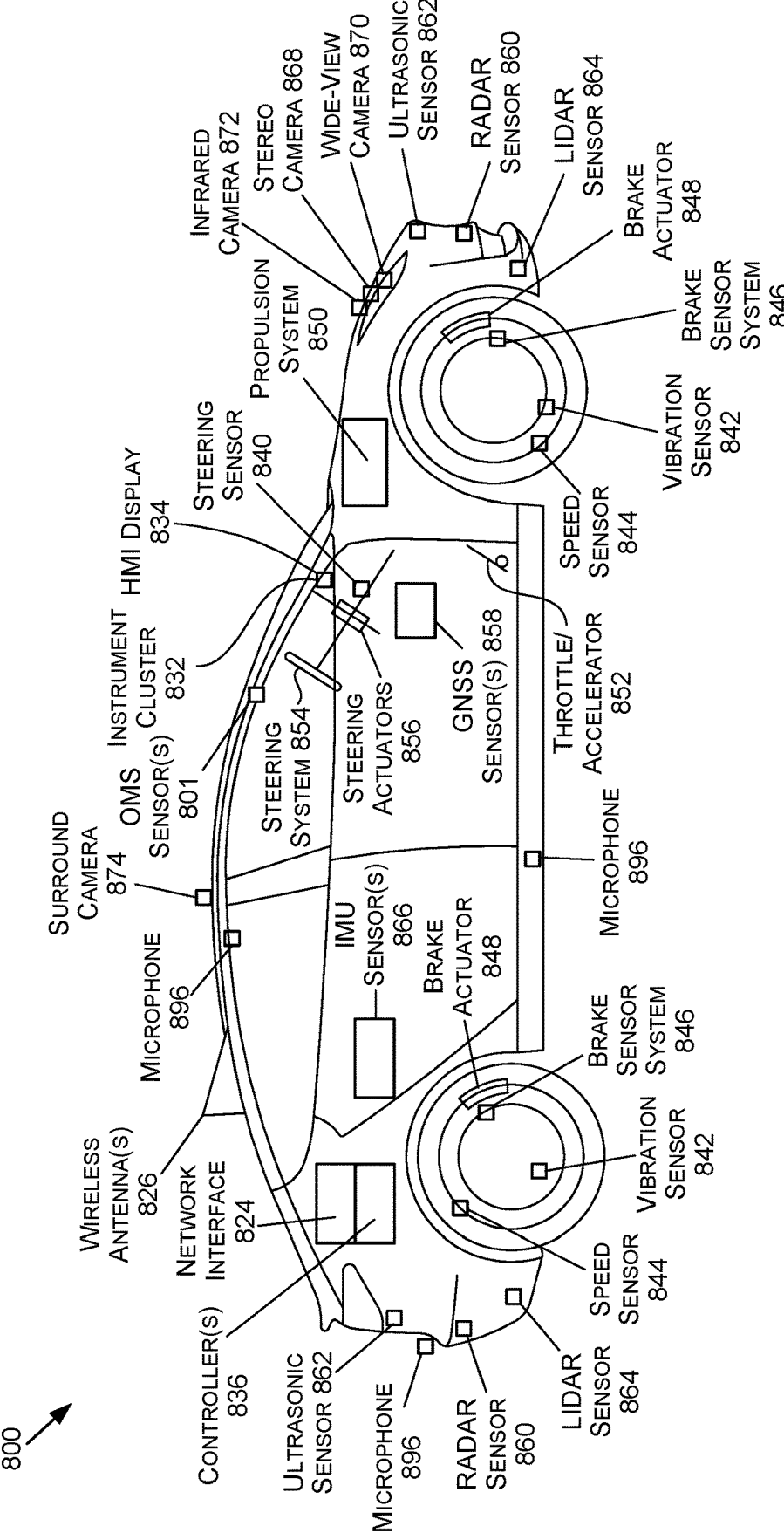
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., for example unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation. In some embodiments, the vehicle 800 may comprise a joint MPC motion policy generator 105 as discussed in FIG. 1 and/or an MPC policy prediction based motion planner 500 incorporating a trained MPC policy prediction model 150 as described with respect to FIG. 5.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), one or more occupant monitoring system (OMS) sensor(s) 801 (e.g., one or more interior cameras), and/or other sensor types.

In some embodiments, perception data 102 and/or perception data 502 may be generated based on sensor input from one or more sensors as discussed with respect to FIGS. 8A to 8D.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the High Definition ("HD") map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 826 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 8B:
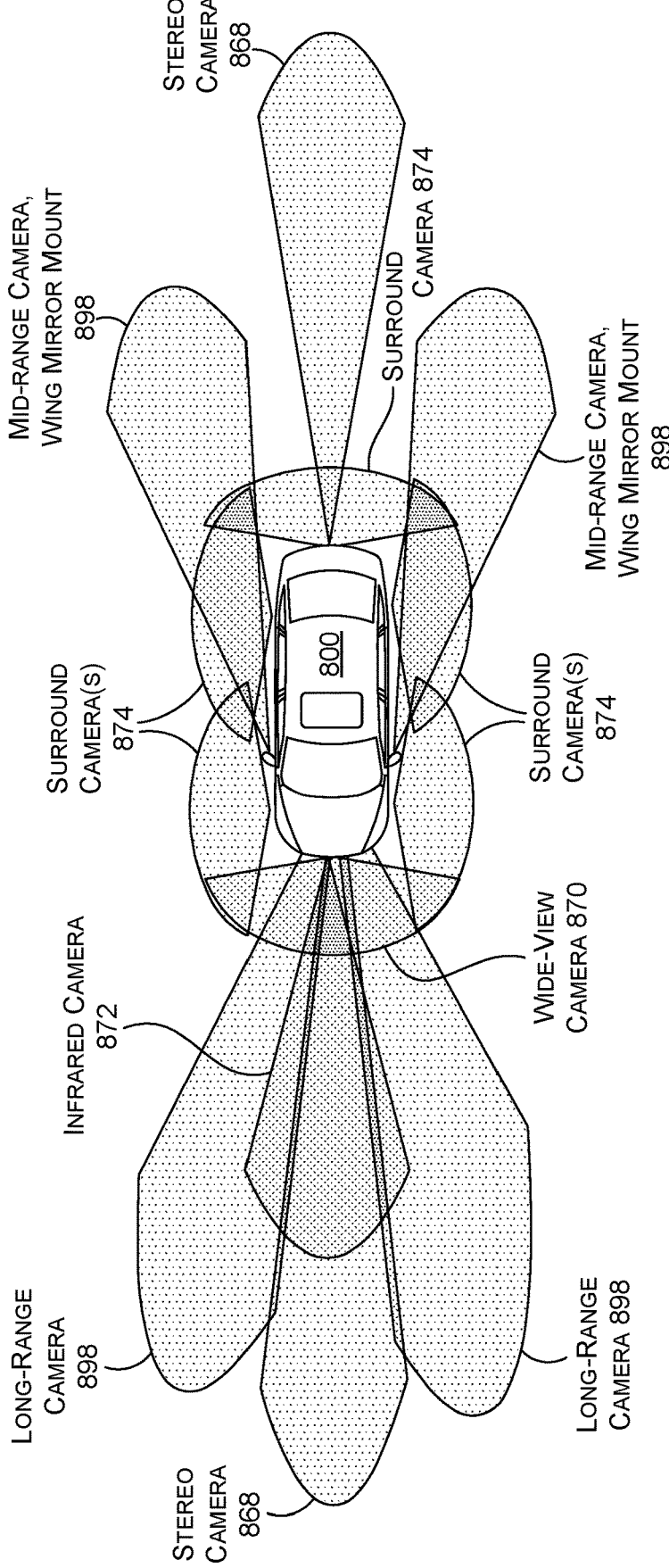
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number (including zero) of wide-view cameras 870 on the vehicle 800. In addition, any number of long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

Any number of stereo cameras 868 may also be included in a front-facing configuration. In at least one embodiment, one or more of stereo camera(s) 868 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Cameras with a field of view that include portions of the interior environment within the cabin of the vehicle 800 (e.g., one or more OMS sensor(s) 801) may be used as part of an occupant monitoring system (OMS) such as, but not limited to, a driver monitoring system (DMS). For example, OMS sensors (e.g., the OMS sensor(s) 801) may be used (e.g., by the controller(s) 836) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 8C:
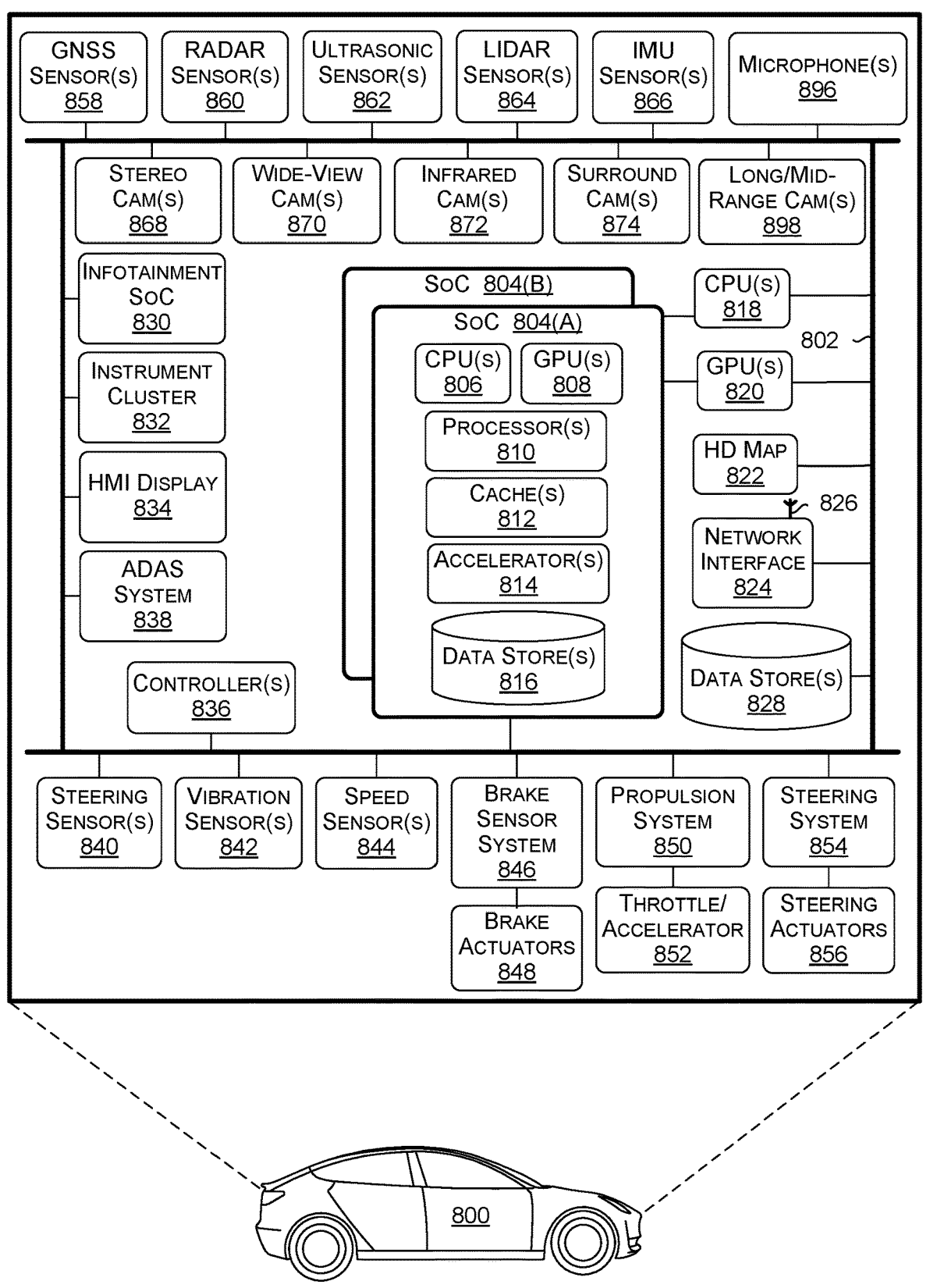
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

In some embodiments, one or more aspects or functions of the joint MPC motion policy generator 105, MPC policy prediction model 150, and/or MPC policy prediction based motion planner 500 may be implemented as code executed by the CPU(s) 806 and/or GPU(s) 808.

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache available to both the CPU(s) 806 and the GPU(s) 808 (e.g., connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 804 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 816 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor, for example a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions (e.g., such as may be performed by the ego-machine motion planner 130). Any number of GNSS sensor (s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, for example electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, for example electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, for example electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) for example trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(D) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
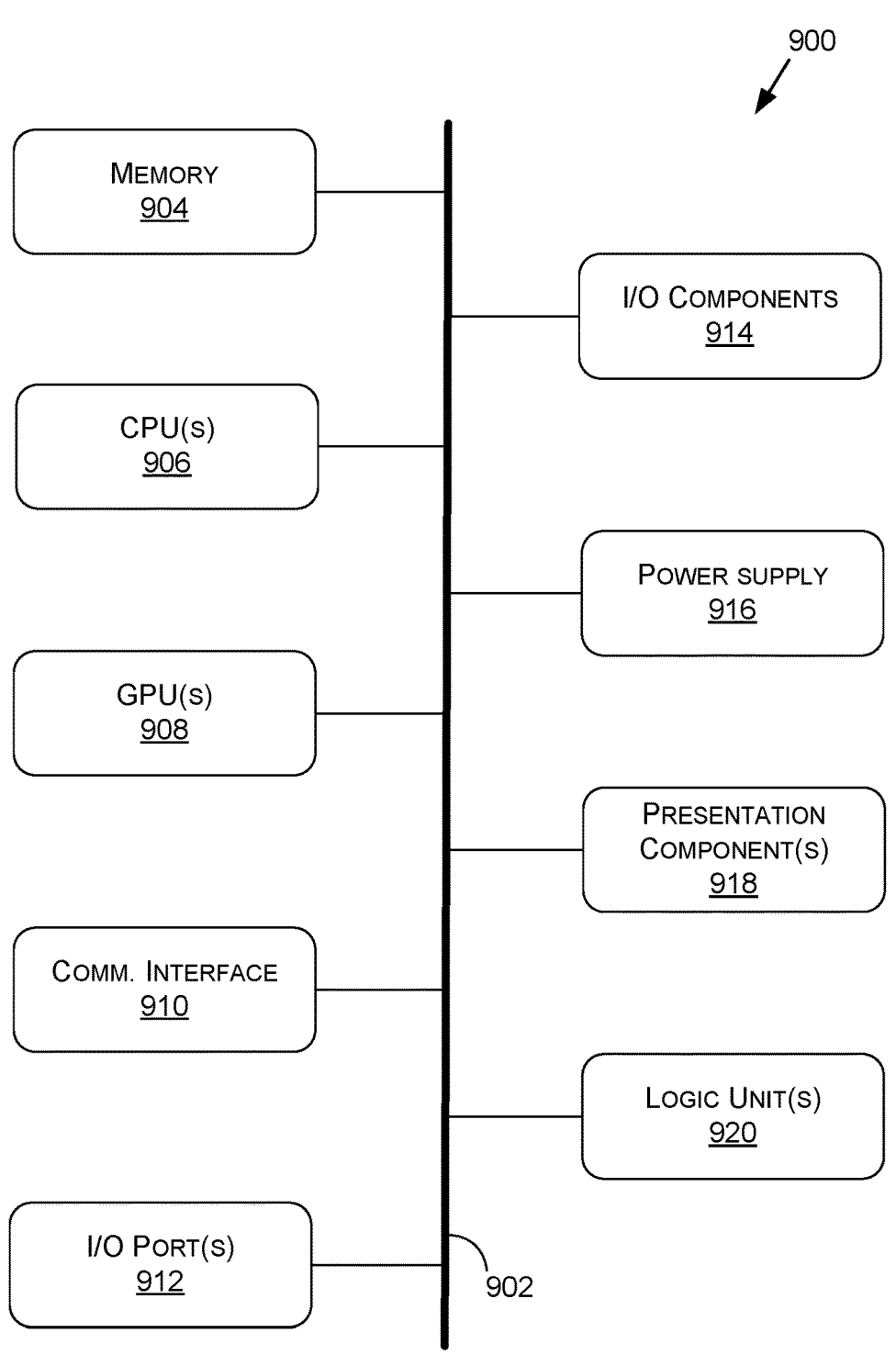
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

In some embodiments, one or more aspects or functions of the joint MPC motion policy generator 105, MPC policy prediction model 150, and/or MPC policy prediction based motion planner 500 may be implemented as code executed by the CPU(s) 906, GPU(s) 908, and/or the logic unit(s) 920.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
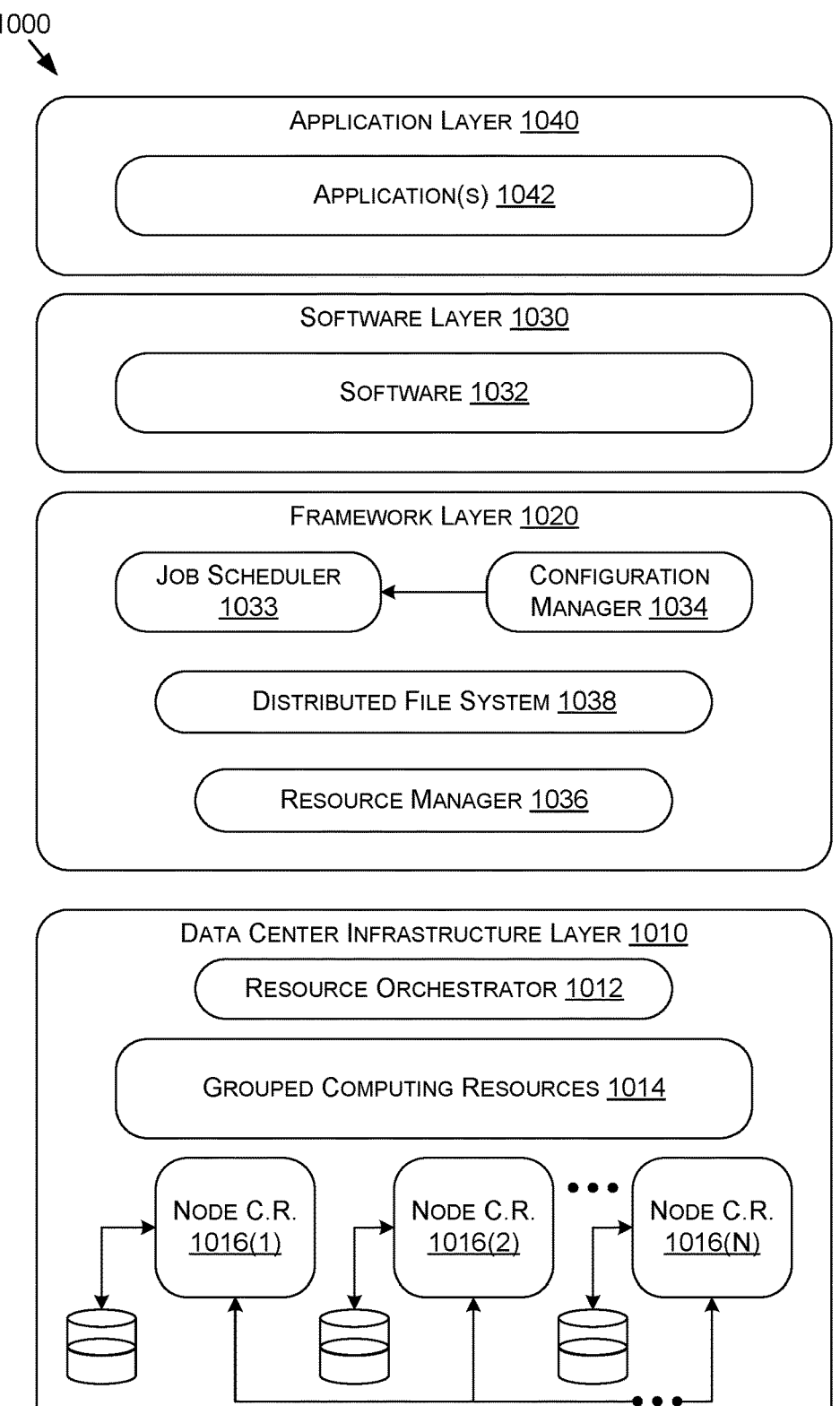
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161 (N) may include one or more virtual components, such as vGPUs, vCPUs, and/or the like, and/or one or more of the node C.R.s 1016(1)-1016(N) may correspond to a virtual machine (VM).

In some embodiments, one or more aspects or functions of the joint MPC motion policy generator 105, MPC policy prediction model 150, and/or MPC policy prediction based motion planner 500 may be implemented as code executed by the node C.R.s 1016(1)-1016(N).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising processing circuitry to:

generate a scenario tree structure based at least on perception data corresponding to a representation of a scene that includes at least one path for each of vehicle traffic, an ego agent, and one or more peripheral agents, the scenario tree structure representing a plurality of trajectory modes for the one or more peripheral agents over a planning horizon; and within the planning horizon, perform a joint model predictive control (MPC) optimization that optimizes a trajectory of the ego agent based at least on a concurrent optimization of trajectories of the one or more peripheral agents, the joint MPC optimization further using the scenario tree structure to generate a policy tree structure that represents a motion policy for navigating the ego agent through the scene.

2. The one or more processors of claim 1, wherein the processing circuitry is further to:

train one or more machine learning models to predict the policy tree structure based at least on training data that includes at least one of the perception data and the policy tree structure.

3. The one or more processors of claim 2, wherein the training data further comprises training samples based at least on the scenario tree structure.

4. The one or more processors of claim 2, wherein the processing circuitry is further to:

adjust the one or more machine learning models based at least on a loss score computed using a loss function, wherein the loss score is computed based at least on a difference between a predicted policy tree structure generated using the machine learning model and a training policy tree structure generated based at least on the joint MPC optimization.

5. The one or more processors of claim 1, wherein the processing circuitry is further to:

predict the plurality of trajectory modes for the one or more peripheral agents using at least one multimodal motion prediction model that jointly predicts the plurality of trajectory modes.

6. The one or more processors of claim 1, wherein the processing circuitry is further to:

generate branches of the scenario tree structure based at least on a divergence between at least two trajectory modes of the plurality of trajectory modes.

7. The one or more processors of claim 1, wherein the processing circuitry is further to:

perform the joint MPC optimization based at least on the ego agent and the one or more peripheral agents in the scene to generate an ego-conditioned tree for the policy tree structure, wherein one or more branches of the policy tree structure represent a behavior adjustment for the ego agent that corresponds to the plurality of trajectory modes for the one or more peripheral agents as represented by the scenario tree structure.

8. The one or more processors of claim 1, wherein the processing circuitry is further to:

using the joint MPC optimization, iteratively advance through one or more time steps of the planning horizon to identify one or more branches in the scenario tree structure; and optimize the trajectory of the ego agent within a time step of the planning horizon against the one or more branches in the scenario tree structure at the time step to generate one or more branches of the policy tree structure.

9. The one or more processors of claim 1, wherein the processing circuitry is further to:

using the joint MPC optimization, generate one or more branches of the policy tree structure based at least on an estimate of an influence of movements of the ego agent on the one or more peripheral agents.

10. The one or more processors of claim 1, wherein the one or more peripheral agents represent at least one of a vehicle, a machine, a pedestrian, or an animal.

11. The one or more processors of claim 1, wherein the ego agent represents at least one of an ego machine or an ego vehicle.

12. The one or more processors of claim 1, wherein the one or more processors is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system for generating synthetic data;

a system for generating synthetic data using AI;

a system incorporating one or more virtual machines (VMs);

a system implemented at least partially in a data center; or a system implemented at least partially using cloud computing resources.

13. A system comprising one or more processors to:

generate perception data corresponding to a representation of at least a portion of an environment that includes at least an ego agent and one or more peripheral agents; and using one or more machine learning models, generate a motion policy for navigating the ego agent through the environment based at least on the perception data, wherein to generate the motion policy, the one or more machine learning models are trained to predict a policy tree structure corresponding to a predicted output of a gradient-based optimization configured to optimize a trajectory of the ego agent based at least on a concurrent optimization of trajectories of the peripheral agents, the optimization being further based at least on the perception data.

14. The system of claim 13, wherein the one or more processors are further to:

perform one or more operations to control a movement of the ego agent through the environment based at least on the motion policy.

15. The system of claim 13, wherein the one or more machine learning models are trained to predict the policy tree structure based at least on training data that includes at least one of the perception data and the policy tree structure.

16. The system of claim 13, wherein the one or more processors are further to:

generate a scenario tree structure based at least on the perception data, the scenario tree structure representing a plurality of trajectory modes for the one or more peripheral agents over a planning horizon; and perform a joint model predictive control (MPC) optimization based at least on the scenario tree structure and the trajectory of the ego agent to generate the policy tree structure.

17. The system of claim 16, wherein the one or more processors are further to:

predict the plurality of trajectory modes for the one or more peripheral agents using at least one multimodal motion prediction model that jointly predicts the plurality of trajectory modes.

18. The system of claim 16, wherein the one or more processors are further to:

generate branches of the scenario tree structure based at least on a divergence between at least two trajectory modes of the plurality of trajectory modes.

19. The system of claim 13, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;

a system for performing deep learning operations;

a system for performing remote operations;

a system for performing real-time streaming;

a system for generating or presenting one or more of augmented reality content, virtual reality content, or mixed reality content;

a system implemented using an edge device;

a system implemented using a robot;

a system for performing conversational AI operations;

a system implementing one or more language models;

a system implementing one or more large language models (LLMs);

a system for generating synthetic data;

a system for generating synthetic data using AI;

a system incorporating one or more virtual machines (VMs);

a system implemented at least partially in a data center; or a system implemented at least partially using cloud computing resources.

20. A method comprising:

generating, using one or more machine learning models, a motion policy for navigating an ego machine through an environment based at least on the one or more machine learning models predicting an output representing a policy tree computed using a gradient-based optimization algorithm that optimizes a trajectory of the ego machine based at least on a concurrent optimization of trajectories of the peripheral agents in response to an input comprising at least one input of environmental perception data associated with the ego machine.

* * * * *